Nov. 17, 1953      B. G. OLVING      2,659,798
CONSTRUCTION FOR ELECTRIC HEATERS
Filed Sept. 3, 1949      2 Sheets-Sheet 1
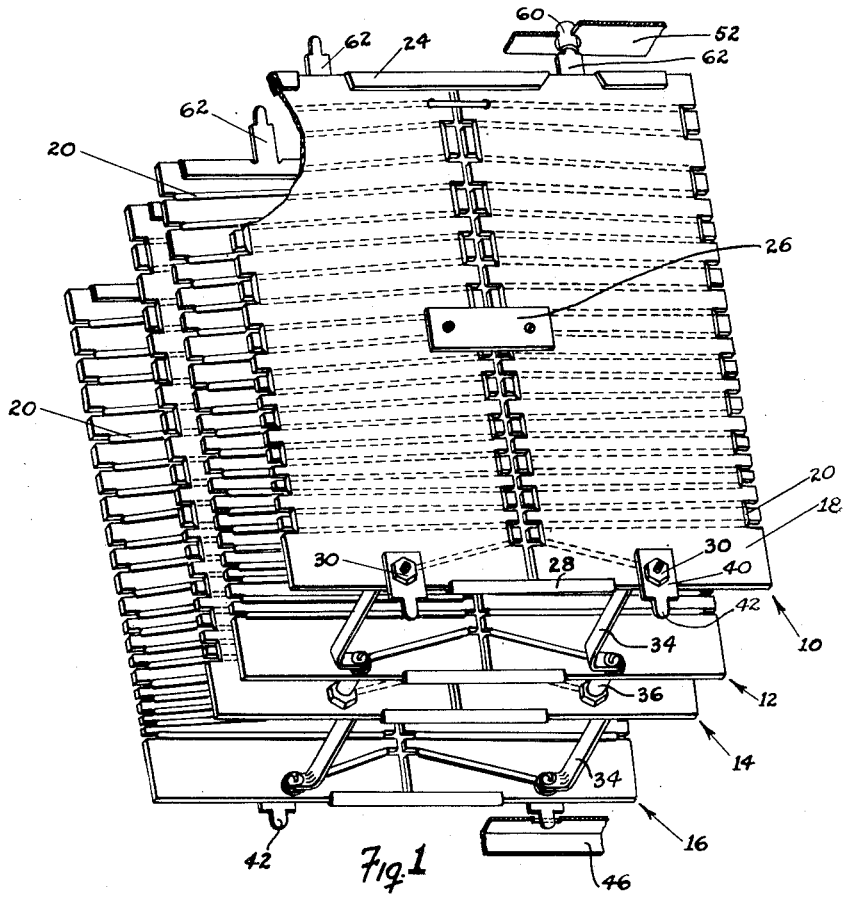
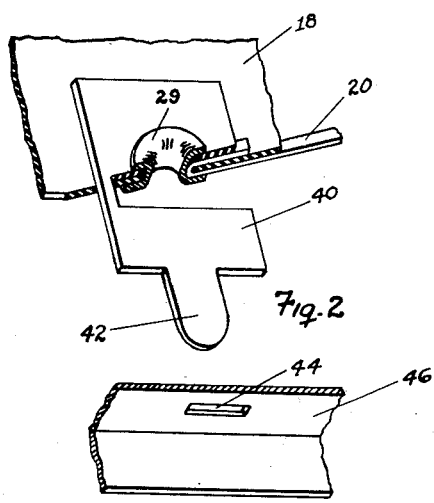
INVENTOR.
BROR G. OLVING
BY
Oscar W Tiere Nov. 17, 1953

B. G. OLVING 2,659,798

CONSTRUCTION FOR ELECTRIC HEATERS

Filed Sept. 3, 1949

INVENTOR.
BROR G. OLVING
BY

Patented Nov. 17, 1953

2,659,798

UNITED STATES PATENT OFFICE 2,659,798

CONSTRUCTION FOR ELECTRIC HEATERS

Bror G. Olving, Elgin, Ill., assignor to McGraw Electric Company, Elgin, Ill., a corporation of Delaware Application September 3, 1949, Serial No. 114,019

2 Claims. (Cl. 219—19)

The present invention relates to electric heating devices and more particularly to the construction, support, and insulation of radiant heating elements for electric toasters and the like.

The provision of a suitable insulating supporting structure for the conductors of an electric heating element has always presented a difficult problem and for many applications, such as electric toasters, there is still no completely satisfactory solution. No one material possesses the refractoriness, the high electric resistivity, the mechanical toughness, and the versatility of form and fabrication that is desired in such a construction. The few materials now in use are essentially compromises and are not always completely satisfactory. Some are expensive and many are suitable only in special forms. For example, porcelain is brittle, especially in thin sections. The best grades of natural mica are expensive, and both bonded mica and the more abundant grades of natural mica are likely to show objectionably high electric conductivity at high temperatures, as for example, immediately after exposure to high humidity. And all mica is friable and mechanically weak. While the conductivity of mica may be too low to interfere with the proper operation of the heating element itself, it may permit sufficient current leakage from the power circuits to the metal frame of an electric appliance to constitute a hazard to persons who handle or use such equipment.

An object of the present invention is the provision of an improved low-cost, low-leakage, sturdy, electric heating element.

Further objects include the provision of an improved support for an electric heating element, the provision of an improved heater construction, and the provision of an improved electric toaster. Other objects and advantages of the invention will be apparent from the following description of a specific embodiment thereof which illustrates one manner in which the invention may be carried out. In the drawings:

Figure 1 is a pictorial view of a heating element assembly for an electric toaster embodying my present invention;

Figs. 2 and 3 are enlarged views of certain details of the assembly of Fig. 1;

Figure 4:
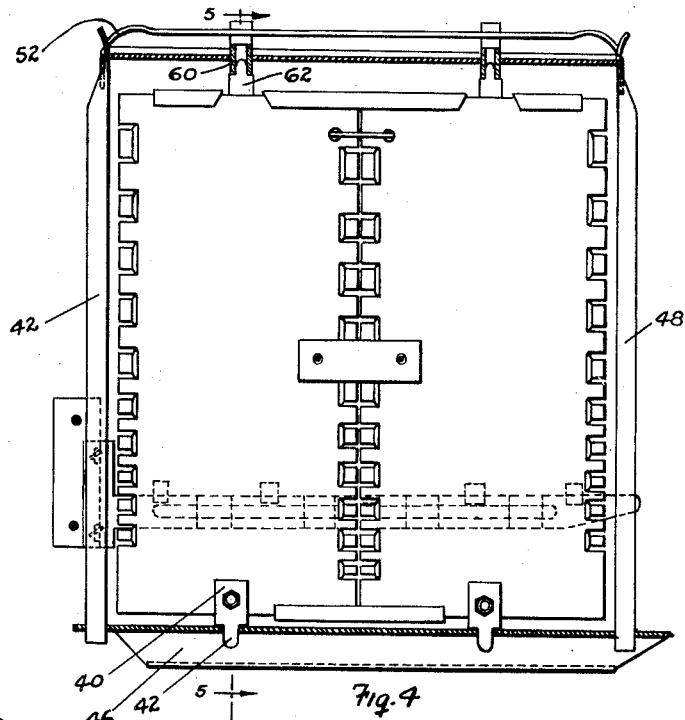
Fig. 4 is an elevational view, partly in section, of a toaster oven which includes the structure of Fig. 1; it constitutes a partial section taken along the line 4—4 of Fig. 5; and, Fig. 5 is a sectional elevation of a toaster which includes the oven of Fig. 4; it constitutes in part a section taken along the line 5—5 of Fig. 4.

The assembly of Fig. 1 comprises four card-like heating elements 10, 12, 14 and 16, each of which includes two sheets of insulating material 18 on which are wound ribbon-like metal conductors 20 in which heat is to be generated by the flow of electric current. While these sheets may be formed of any of a large number of materials, I prefer bonded mica, since it has sufficient strength for the purpose if it is handled carefully, is not damaged by the red-heat temperatures at which the conductors 20 are operated, provides sufficiently good electric insulation to permit the proper operation of the heater itself, and is lower in cost than other materials having comparable properties. Two such sheets 18 are first fastened together by a metal clip 24. The conductor 20 is wound or strung on the two sheets, which are then further fastened together by an insulating cleat 26 and a second metal clip 28. The ends of the conductor 20 are threaded through holes at the lower edges of the sheets and clamped by riveted metal grommets 29 (see Fig. 2).

The two outer elements 10 and 16 of the four-element assembly of Fig. 1 have special insulating supporting strips or tabs 40 also held by the grommets 29, and extending below the lower edges of the elements. These supports 40 are made of an insulating material which provides the superior insulation against electric leakage that bonded mica sheets 18 may lack and which also is able to withstand high temperatures and mechanical stress. I prefer sheet material made up of laminations of fiberglass impregnated with silicone resin. I have found that such material is far superior to mica and other high-temperature resistant materials in both mechanical strength and electric resistivity. Although it would not survive as high a temperature as will mica, it is kept cooler than the mica in the present construction because most of the heat is carried up by the draft through the toaster. And furthermore, only the resin, and not the glass, would decompose at temperatures that the mica will withstand, and such decomposition would produce only a reduction in mechanical strength, for the electric resistivity would remain high.

These insulators 40, when made of fiberglass laminate, are sufficiently strong that those attached to the two outermost heating elements 10 and 16 can support the weight of the whole assembly, thereby reducing the cost. The four heating elements 10, 12, 14 and 16 are fastened together by beam-like metal brackets 34 and spacers 36 which are held by terminal bolts 30 which pass through the grommets 29, and therefore constitute electric connectors as well as mechanical fastenings.

Figure 5:
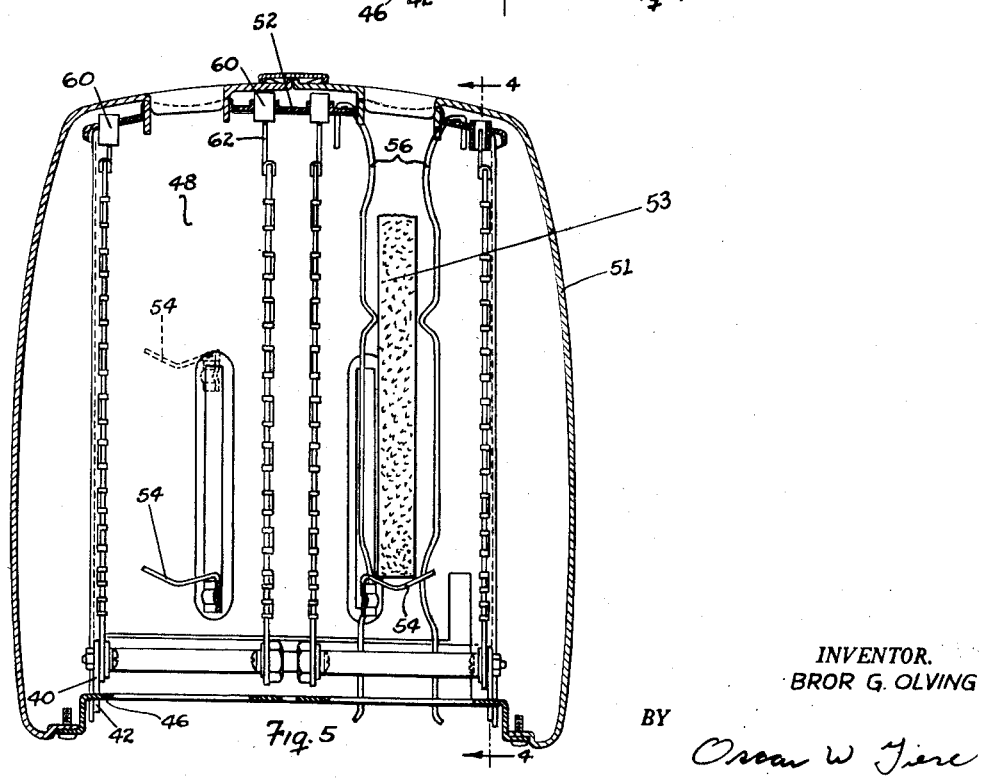

As may be seen best in Figs. 4 and 5, the downwardly extending tongues 42 of the insulators 40 set in slots 44 (see also Figs. 2 and 3) in the metal base plate 46 of the toaster oven. The oven structure includes also end walls 48 and a slotted top plate 52, and is enclosed by a case 51. Slices of bread 53 are adapted to be inserted in the oven through the slots in the top plate and casing to rest on racks 54 which are movable vertically, as shown in dotted lines in Fig. 5, by mechanism not shown. Wire guards 56 support the bread slices laterally and center them between the heating elements.

Because heat rises, the top portions of the heating elements operate at a somewhat higher temperature than do the bottom portions and therefore the upper edges of the four heating elements 10, 12, 14 and 16 carry porcelain insulators 60. The clips 24 at the tops of the heating elements include upwardly-extending metal-shouldered projections 62. The tubular porcelain insulators 60 rest on these projections and lie in apertures in the oven top piece 52, and are retained by the case 51. They provide lateral support for the heating elements during operation and of course carry the weight of the heating elements when the toaster is inverted. Certain constructions here shown and described are claimed in the co-pending application of D. A. Gustafson, Ser. No. 113,950, filed September 3, 1949, now Patent 2,620,426.

The present invention provides a construction wherein a high-temperature insulator, which is not proof against leakage, is combined with a high resistance insulator that provides reliable protection against such leakage, although it, by itself, could not withstand the high temperatures. Furthermore it provides a construction in which the best use is made of the desirable properties of each material, and the use of the more expensive material is kept to a minimum. For electric toasters operating at 115 volts A. C., a leakage current of .2 of a milliampere from the power circuits to the case is now considered the maximum amount permissible. It has been found that some samples of the cheaper forms of mica, such as bonded mica sheets, may under certain extreme conditions permit leakages far in excess of this value. I have found that the construction of the present invention insures low leakage, well under .2 milliampere, even under conditions of extreme abuse. I have found that the present construction is mechanically rugged. It is to be noted, for example in Fig. 1, that the bridging structure consisting of the brackets 34 and spacer 36 does not impose any bending or tensile forces on the mica sheets 18, and so constitutes a strong support for the heating elements.

The invention includes all such modifications and variations as fall within the appended claims.

I claim:

1. In an electric heating construction, in combination a supporting frame, an insulating sheet of bonded mica which may become electrically conducting at operating temperatures, a resistance conductor wound on said sheet, a high temperature insulating member comprising a laminate of fiberglass fabric fastened to said sheet and extending beyond the margin thereof for engaging said frame and for supporting said sheet on said frame but out of contact with said frame, said member having an electric resistivity at said operating temperatures that is very high compared to that of the material of said sheet.

2. In an electrically heated appliance, the combination with a case-and-frame structure having an exposed, electric-conducting surface, an electric heating element comprising an insulating sheet of mica or the like which may become electrically conducting at operating temperatures and a resistance heating conductor wound on said sheet; of heat-resisting, electric-insulating tabs separate from but fastened to said sheet near an edge thereof and extending beyond the margin thereof for directly engaging said case-and-frame structure and for supporting said sheet thereon out of contact therewith and for providing a high insulation against electric leakage from said conductor to said exposed conducting surface particularly during heated operation of the appliance, said tabs being formed of a laminated insulating material different from the material of said sheet and impregnated with silicone resin and having an electric resistivity at said operating temperatures that is very high compared to that of the material of said sheet.

BROR G. OLVING.

References Cited in the file of this patent

UNITED STATES PATENTS

| Number | Name | Date |
|---|---|---|
| 1,108,554 | Copeman | Aug. 25, 1914 |
| 1,466,656 | Barr et al. | Sept. 4, 1923 |
| 1,753,601 | Eaton | Apr. 8, 1930 |
| 1,841,301 | Schroeder et al. | Jan. 12, 1932 |
| 1,900,249 | Miller et al. | Mar. 7, 1933 |
| 1,916,066 | Moyle | June 27, 1933 |
| 2,049,717 | Pavelka | Aug. 4, 1936 |
| 2,133,183 | Baird et al. | Oct. 11, 1938 |
| 2,141,867 | Ireland | Dec. 27, 1938 |
| 2,197,221 | Koci | Apr. 16, 1940 |
| 2,419,355 | Koci | Apr. 22, 1947 |
| 2,620,426 | Gustafson | Dec. 2, 1952 |

FOREIGN PATENTS

| Number | Country | Date |
|---|---|---|
| 614,587 | Great Britain | Dec. 17, 1948 |

OTHER REFERENCES

Knowlton: Standard Handbook for Electrical Engineers; 7th ed.; McGraw-Hill Book Co.